US006752873B2

(12) United States Patent
Kato et al.

(10) Patent No.: US 6,752,873 B2

(45) Date of Patent: Jun. 22, 2004

(54) APPARATUS FOR PRODUCING COATING LAYER ONTO PRIMARY LINING

(75) Inventors: Shuzo Kato, Chiba (JP); Shintaro Ikeda, Kanagawa (JP); Kotaro Masuda, Kanagawa (JP); Takaharu Izumo, Osaka (JP)

(73) Assignee: Taisei Corporation, Tokyo (JP)

(*) Notice: Subject to any disclaimer, the term of this patent is extended or adjusted under 35 U.S.C. 154(b) by 0 days.

(21) Appl. No.: 10/461,883

(22) Filed: Jun. 16, 2003

(65) Prior Publication Data

US 2004/0003773 A1 Jan. 8, 2004

(30) Foreign Application Priority Data

Jun. 17, 2002 (JP) ....................................... 2002-175431

(51) Int. Cl.[7] ............................ B05B 13/06; B05C 5/00

(52) U.S. Cl. ................ 118/317; 118/306; 118/DIG. 10; 427/236

(58) Field of Search ................................ 118/317, 306, 118/DIG. 10; 427/181, 236, 230; 239/173, 722

(56) References Cited

U.S. PATENT DOCUMENTS

| | | | | |
|---|---|---|---|---|
| 3,957,203 A | * | 5/1976 | Bullard | 239/128 |
| 4,329,937 A | * | 5/1982 | Holland | 118/105 |
| 4,779,798 A | * | 10/1988 | Natolino et al. | 239/227 |
| 4,798,474 A | * | 1/1989 | Daily | 118/408 |
| 6,454,857 B1 | * | 9/2002 | Glasner et al. | 118/306 |
| 2003/0039752 A1 | * | 2/2003 | Winiewicz et al. | 427/236 |

FOREIGN PATENT DOCUMENTS

| | | |
|---|---|---|
| JP | A-10-174740 | 6/1998 |
| JP | A-2001-87452 | 3/2001 |
| JP | A-2001-327850 | 11/2001 |
| JP | A-2001-327853 | 11/2001 |
| JP | 2002-1175 | 1/2002 |
| JP | A-2002-52120 | 2/2002 |
| JP | A-2002-224283 | 8/2002 |
| JP | A-2003-47779 | 2/2003 |
| JP | A-2003-53041 | 2/2003 |
| JP | A-2003-62159 | 3/2003 |
| JP | A-2003-111891 | 4/2003 |
| JP | A-2003-111897 | 4/2003 |
| JP | A-2003-117073 | 4/2003 |
| JP | 2003-138895 | 5/2003 |
| JP | A-2003-144646 | 5/2003 |
| JP | A-2003-144707 | 5/2003 |
| JP | A-2003-144709 | 5/2003 |
| JP | A-2003-154078 | 5/2003 |
| JP | A-2003-159381 | 6/2003 |
| JP | A-2003-164576 | 6/2003 |
| JP | A-2003-180528 | 7/2003 |
| JP | A-2003-190412 | 7/2003 |
| JP | A-2003-190445 | 7/2003 |
| JP | A-2003-190531 | 7/2003 |
| JP | A-2003-199886 | 7/2003 |
| JP | A-2003-199933 | 7/2003 |
| JP | A-2003-199941 | 7/2003 |
| JP | A-2003-199942 | 7/2003 |
| JP | A-2003-199943 | 7/2003 |
| JP | A-2003-210692 | 7/2003 |
| JP | A-2003-159379 | 8/2003 |

* cited by examiner

*Primary Examiner*—Richard Crispino
*Assistant Examiner*—Yewebdar Tadesse
(74) *Attorney, Agent, or Firm*—Antonelli, Terry, Stout & Kraus, LLP

(57) ABSTRACT

In order to reliably form a coating layer on the interior surface of a primary lining such as an underground pipe, etc., in a short time and form a coating layer having a uniform thickness, a spray gun 62 is attached to a revolving ring 30 attached to a running truck 2, right and left drive wheels of the running truck 2 are respectively independently driven and controlled to moving the running truck 2 in a primary lining 90 while the revolving ring 30 is rotated at a steady peripheral velocity to blow out a coating material from the spray gun 62, whereby a homogenous coating layer is formed with a fixed thickness on the interior surface of the primary lining 90.

12 Claims, 12 Drawing Sheets

7
24
6
7
8
12
9
10
11
11
10
9
12
8

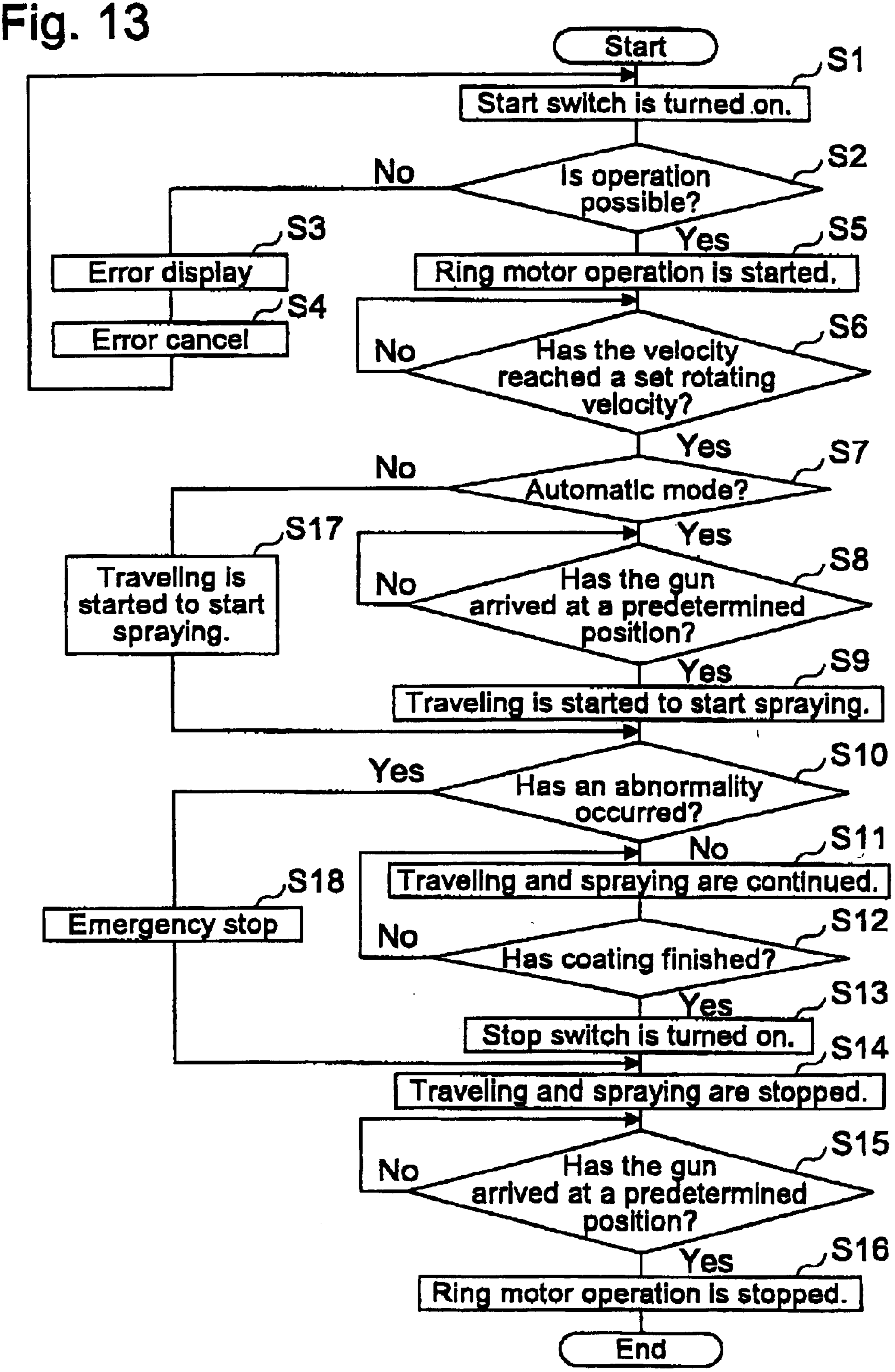
Fig. 13
Start
S1
Start switch is turned on.
S2
Is operation possible?
No
Yes
S3
Error display
S4
Error cancel
S5
Ring motor operation is started.
S6
Has the velocity reached a set rotating velocity?
No
Yes
S7
Automatic mode?
No
Yes
S17
Traveling is started to start spraying.
S8
Has the gun arrived at a predetermined position?
No
Yes
S9
Traveling is started to start spraying.
S10
Has an abnormality occurred?
Yes
No
S11
Traveling and spraying are continued.
S18
Emergency stop
S12
Has coating finished?
No
Yes
S13
Stop switch is turned on.
S14
Traveling and spraying are stopped.
S15
Has the gun arrived at a predetermined position?
No
Yes
S16
Ring motor operation is stopped.
End 90
92
1
91

APPARATUS FOR PRODUCING COATING LAYER ONTO PRIMARY LINING

BACKGROUND OF THE INVENTION

1. Field of the Invention

The present invention relates to an apparatus for producing a coating layer onto a primary lining, which can reliably form a coating layer in a short time on the interior surface of a primary lining composed of segments assembled after propelling a shield tunneling machine.

2. Description of Related Art

Immediately after drilling by propelling a shield tunneling machine, a primary lining is formed by a plurality of segments. For this primary lining, a concrete segment, a composite segment, which, for example, is made of steel and concrete, or a steel segment has been used, and to the inside of this segment, a secondary lining by mortar has been applied. In recent years, with the aim of reducing constructing costs, improving acid resistance, and improving flowability, as shown in, for example, Japanese Unexamined Patent Publication No. Hei-9-72197, a construction method where the secondary lining is omitted by forming a coating of an organic material as an anticorrosion material on the interior surface of segments has been disclosed, and this method has already been used in some area. Such construction methods where the secondary lining is omitted include a method for forming segments by molding concrete and an organic coating on the construction site.

A coating apparatus having a revolving frame for covering the interior surface of segments with an organic coating after completing primary lining is constructed such that, as shown in FIG. 15, to a connecting portion 101 on the tip of a rotation shaft 100 rotated by a drive motor, a balance shaft 102 is attached orthogonally to the rotation shaft 100, a balancer 103 is attached to one end of this balance shaft 102 so that the position is variable, one end of a gun holding shaft 104 slidably attached to the connecting portion 101 of the rotation shaft 100 is fixed to the balancer 103, a spray gun 105 is attached to an end opposite the balancer 103 so as to keep the balance between the balancer 103 and spray gun 105 with respect to the rotation shaft 100. Moreover, by applying a polyurethane resin coating material while rotating the rotation shaft 100 by the drive motor to rotate the spray gun 105, the interior surface of segments is continuously covered with an organic coating.

SUMMARY OF THE INVENTION

When segments having a large diameter, for example, approximately 3 to 5 meter are coated by the coating apparatus, the distance between the rotation shaft rotated by the drive motor and balancer becomes large, therefore, rotational torque of the gun holding shaft having the balancer and spray gun becomes large. Accordingly, there exists a drawback in an increase size of the drive motor.

In addition, since the spray gun is rotated approximately at the center of the gun holding shaft having a large rotational torque, it is difficult to keep peripheral velocity at a constant rate when the spray gun is rotating and applying a coating material. Accordingly, there also exists a drawback in that the coating material to be applied to the interior surface of segments fluctuates depending on the spray gun rotating position, thus resulting in a coating of uneven thickness.

The present invention has been made to improve such drawbacks, and it is an object of the present invention to provide an apparatus for producing a coating layer onto a primary lining which can reliably form a coating layer on the interior surface of an underground pipe, a primary lining, etc., in a short time and can also form a coating of a uniform thickness.

An apparatus for producing a coating layer onto a primary lining according to the present invention comprises: a running truck; a revolving ring mechanism; a spray gun mechanism; and a controller, and is characterized in that the running truck has a drive for independent driving control of right and left drive wheels in the forward direction, respectively, and that the revolving ring mechanism has a revolving ring, a revolving ring support frame, and a revolving ring drive mechanism, where the revolving ring is formed by connecting two frames formed in an annular shape by a plurality of connecting shafts in parallel, and the revolving ring support frame has an upper frame and a lower frame, where the upper frame is formed in a T-shape by a support frame and a guide frame provided orthogonally to the end of the support frame, while the lower frame is formed in another T-shape by a support frame and a guide frame provided orthogonally to the end of the support frame, and the support frame of the upper frame is attached to a front surface in a forward direction of the running truck via a centering mechanism, and the support frame of the lower frame is attached to the support frame of the upper frame so as to be shiftable, and on both ends of the respective second guide frames provided are guide rollers to be latched with the inner circumferential surface of the revolving ring, respectively, and the revolving ring drive mechanism has a revolving ring drive motor for rotating a drive transmission mechanism to be engaged with a drive chain or rack provided in an annular shape in the inner circumferential portion of the revolving ring and one or a plurality of brakes attached to the respective guide frames, and that the spray gun mechanism has a spray gun attached to the revolving ring, a rotary joint attached to the running truck, and a supply hose joined to rotational-side pipes of the spray gun and rotary joint, and that the controller rotates the revolving ring at a steady peripheral velocity while a coating material is ejected from the spray gun.

It is desirable that the revolving ring is separable into four parts or six parts.

In addition, it is preferable that the controller rotates the rotary joint in synchronization with a rotation of the revolving ring.

Furthermore, the apparatus for producing a coating layer onto a primary lining comprises: a position detecting sensor for detecting a reference provided on the revolving ring; and a peripheral velocity operating means provided in the controller, for calculating a peripheral velocity of the revolving ring based on an output signal from the position detecting sensor. Moreover, it is desirable the controller makes, after the peripheral velocity of the revolving ring becomes steady, the running truck moves and applies a coating material from the spray gun.

It is desirable that the spray gun is a mixing and colliding type. Preferably, a thermosetting resin such as a polyurea resin coating material and a polyurea resin coating material is applied by the spray gun.

DESCRIPTION OF THE DRAWINGS

FIG. 13 is a flowchart showing a coating operation;

DESCRIPTION OF PREFERRED EMBODIMENTS

Figure 1:
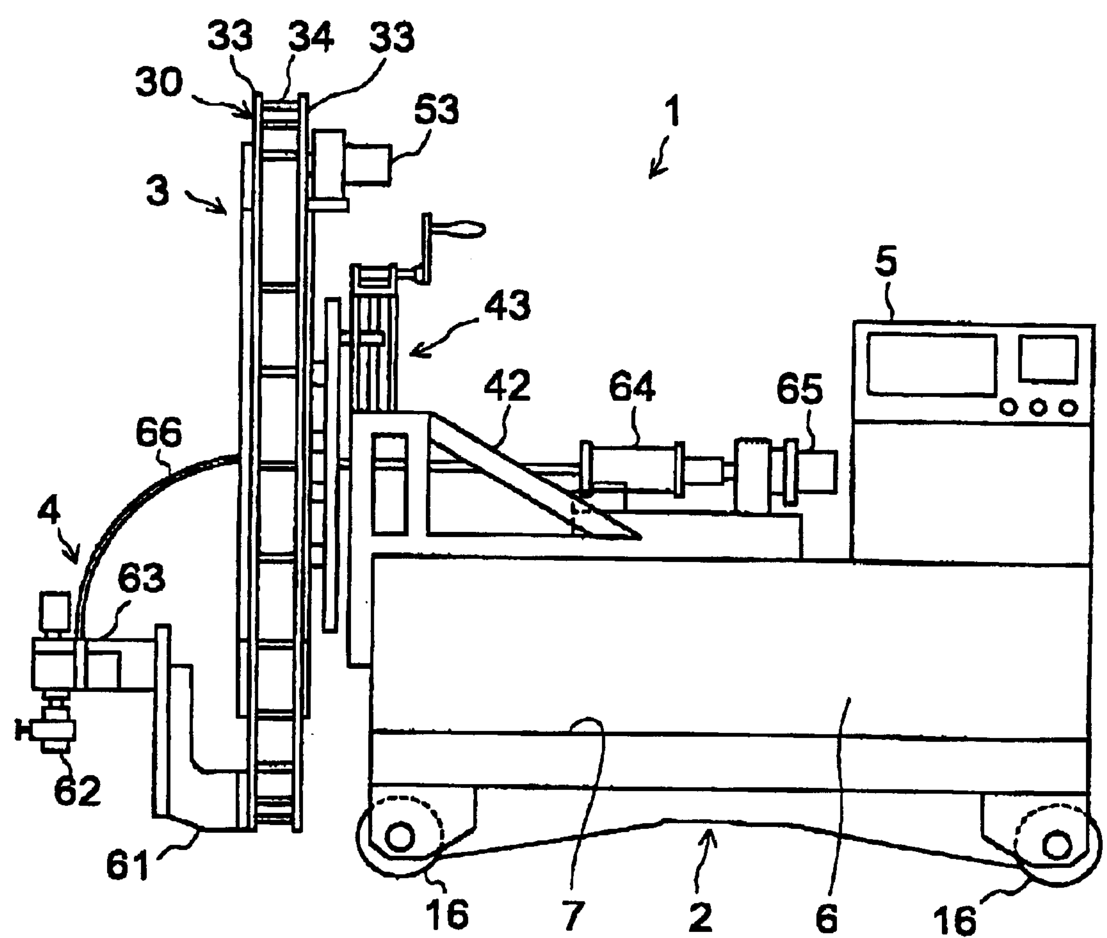
FIG. 1 is a side view showing a configuration of an apparatus for producing a coating layer onto a primary lining of the present invention.
Figure 2:
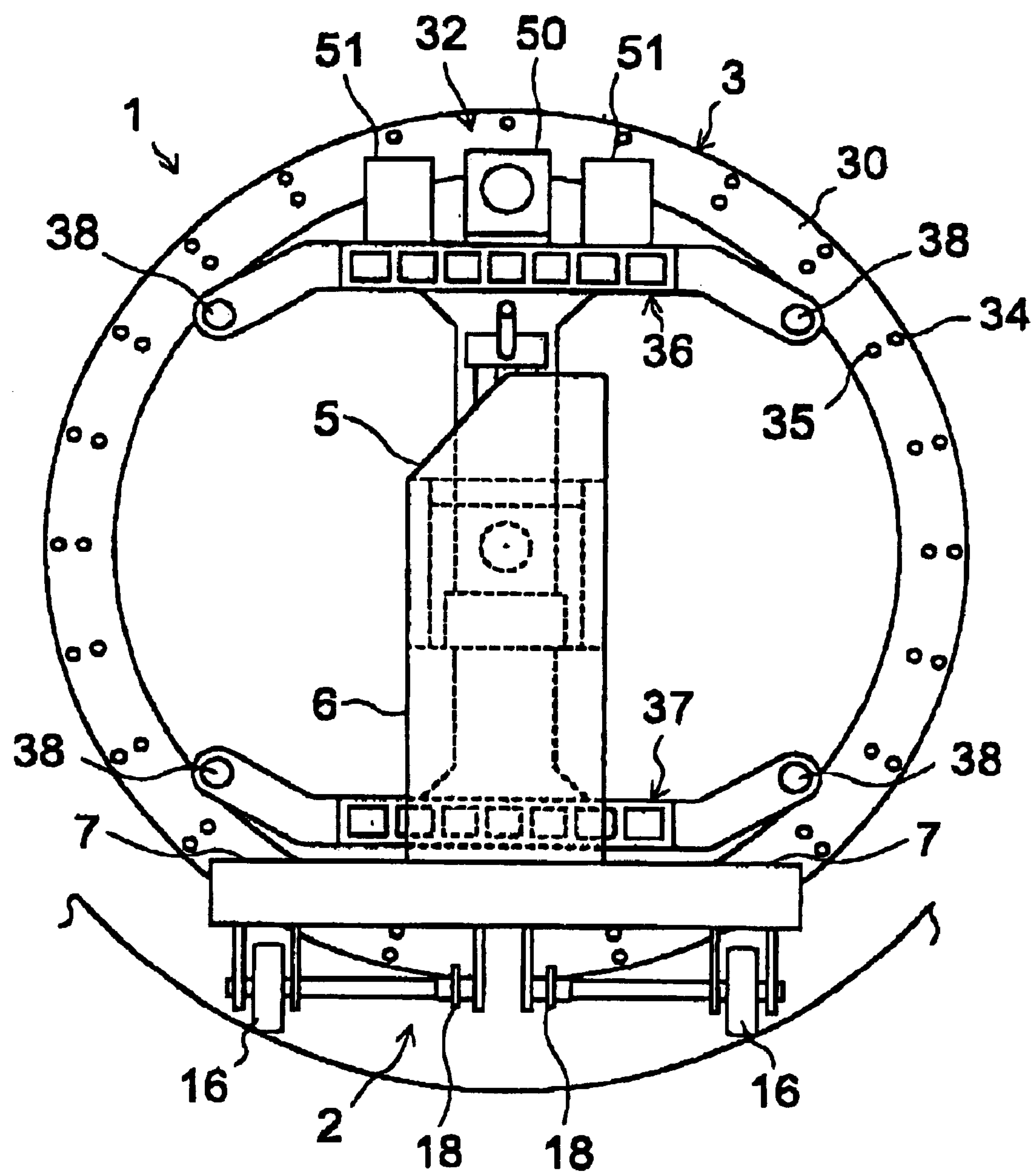
FIG. 2 is a front elevation view showing a configuration of the above-described apparatus for producing a coating layer onto a primary lining.

FIG. 1 and FIG. 2 show a configuration of an apparatus for producing a coating layer onto a primary lining of the present invention, wherein FIG. 1 is a side view and FIG. 2 is a front elevation view. As shown in the drawings, an apparatus for producing a coating layer onto a primary lining 1 has a running truck 2, a revolving ring mechanism 3, a spray gun mechanism 4, and a controller 5.

Figure 3:
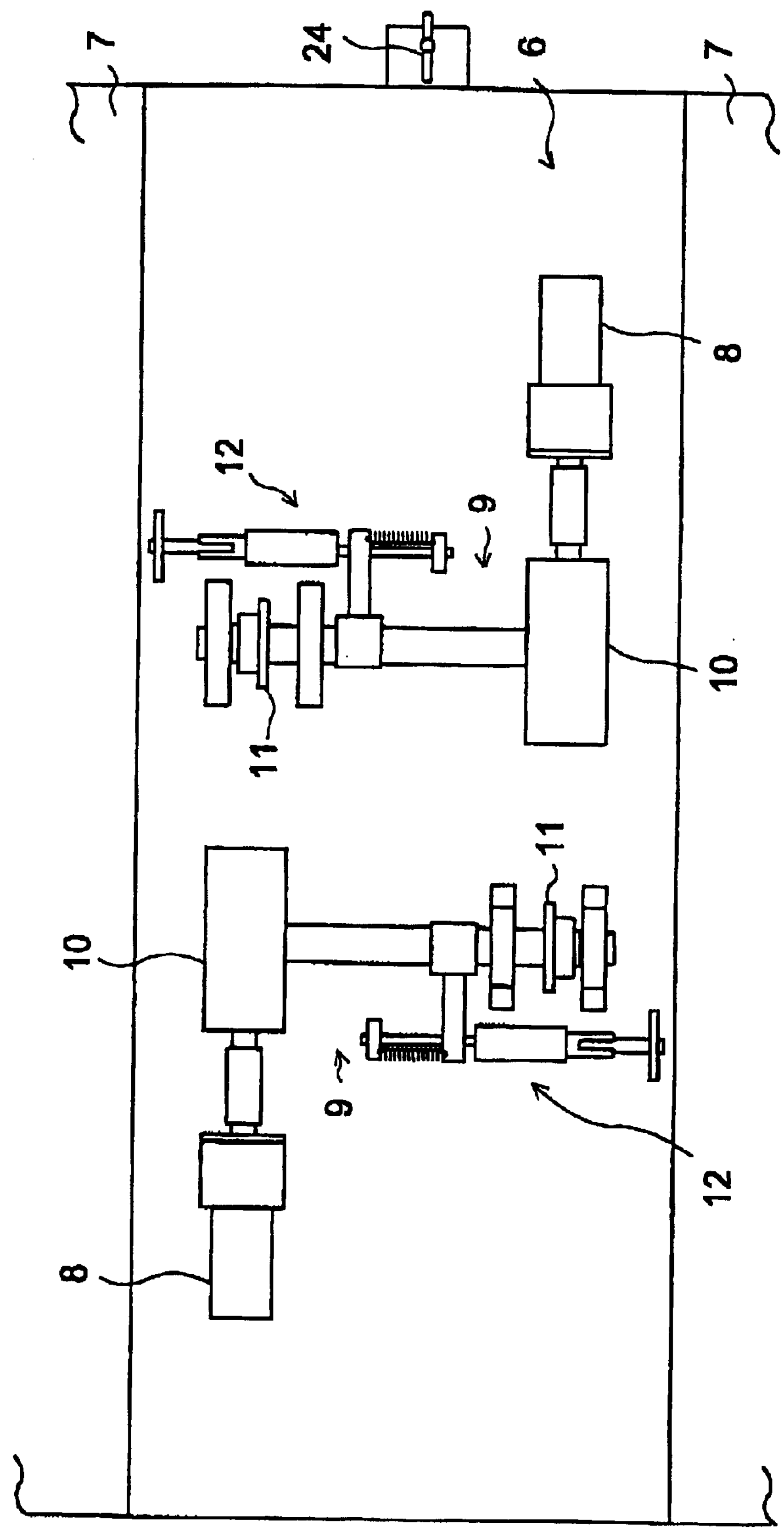
FIG. 3 is a plan view showing a configuration of a drive of a running truck.
Figure 4:
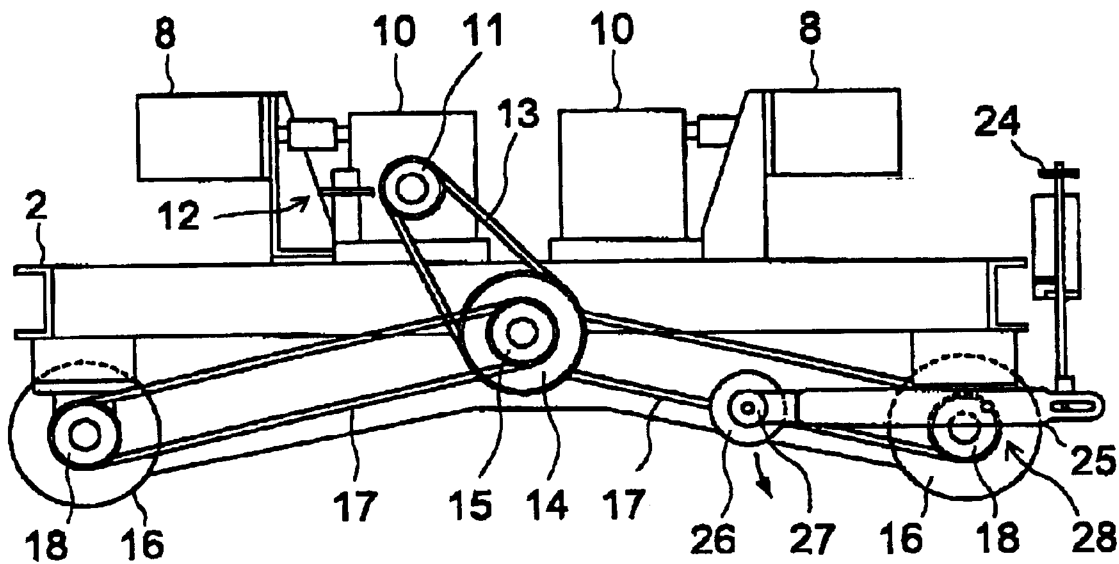
FIG. 4 is a side view showing a configuration of a drive of a running truck.

The running truck 2 has a truck drive 6 in its central part and has a work stage 7 on either side thereof. In the running truck 6, as shown in a plan view of FIG. 3, right and left running motors 8 are provided symmetrical with respect to a point, and to a driving shaft of each running motor 8, a drive transmission mechanism 9 is connected. The drive transmission mechanism 9 has a speed reducer 10 connected to the driving shaft of the running motor 8, a clutch mechanism portion 12 provided between an output shaft of the speed reducer 10 and a first sprocket 11, a second sprocket 14 connected, as shown in a sectional view of FIG. 4, to the first sprocket 11 via a chain 13, a third sprocket 15 provided on a rotation shaft of the second sprocket 14, and a fourth sprocket 18 provided on a rotation shaft of a drive wheel 16, connected to the third sprocket 15 via a chain 17.

Figure 5:
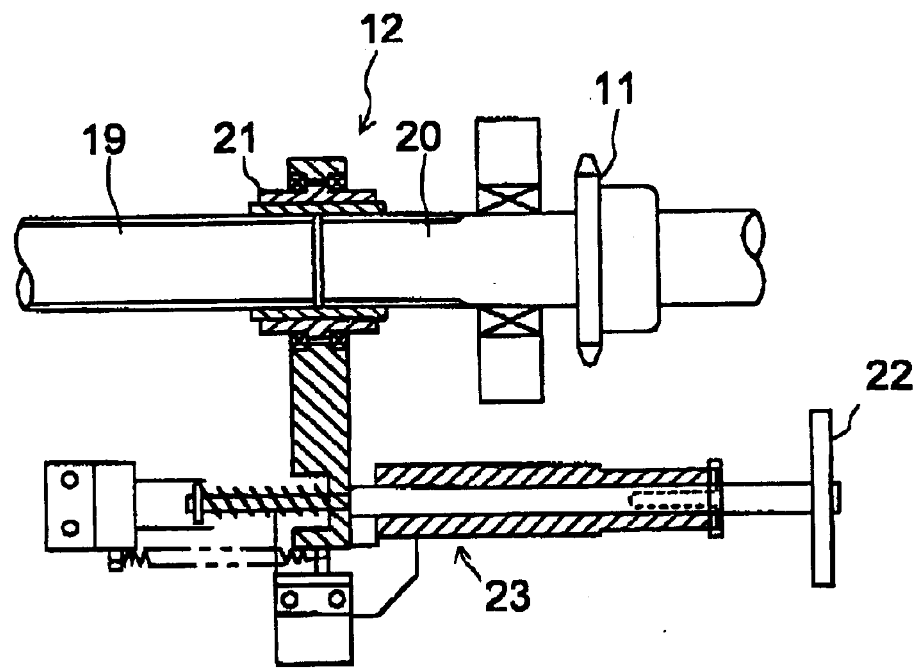
FIG. 5 is a constructional view of a clutch mechanism portion of a drive of a running truck.

As shown in a constructional view of FIG. 5, the clutch mechanism 12 has a spline bearing 21 for connecting a spline shaft 19 connected to an output shaft of the speed reducer 10 with a spline shaft 20 provided on a rotation shaft of the first sprocket 11. The clutch mechanism 12 also has a clutch switching portion 23 which shifts, by turning a handle 22, the spline bearing 21 toward the spline shaft 19 side to release a connection between the spline shaft 19 and spline shaft 20 and shifts, by drawing out the handle 22, the spline bearing 21 toward the spline shaft 20 side to connect the spline shaft 19 and spline shaft 20. Moreover, the truck drive 6 includes a distance measuring roller 26 provided on the tip of a frame 25 rotated in the up-and-down direction by operation of a handle 24 attached to the running truck 2. The truck drive 6 also has a running-distance-measuring device 28 having an encoder 27 for detecting a number of revolutions of the distance measuring roller 26.

Figure 6:
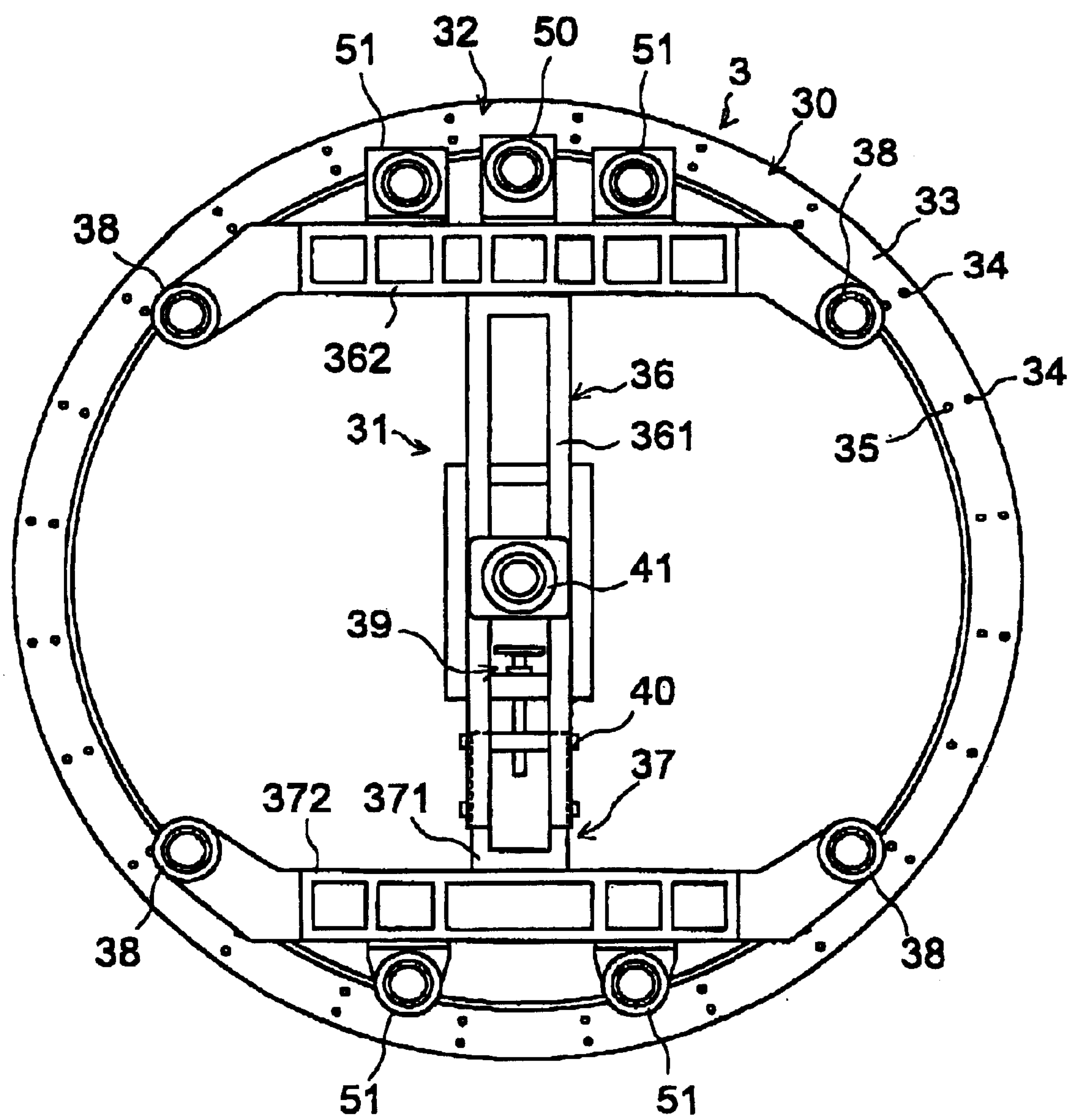
FIG. 6 is a front view showing a configuration of a revolving ring mechanism.

As shown in a front view of FIG. 6, the revolving ring mechanism 3 has a revolving ring 30, a revolving ring support frame 31, and a revolving ring drive mechanism 32. The revolving ring 30 is formed, as shown in a constructional view of FIG. 7, by connecting two annularly formed frames 33 in parallel by a plurality of connecting shafts 34, 35. The revolving ring support frame 31 has an upper frame 36 and a lower frame 37. The upper frame 36 is formed in a T-shape by a guide frame 361 and a guide frame 362 provided orthogonally to the end of the support frame 361, and the lower frame 37 is also formed in a T-shape by a guide frame 371 and a guide frame 372 provided orthogonally to the end of the support frame 371. Both ends of the guide frame 362 of the upper frame 36 and the guide frame 372 of the lower frame 37 each have, as shown in a constructional view of FIG. 8, a guide roller 38 to be latched with the inner circumferential surface of the revolving ring 30. Into this part of the guide roller 38 to be latched with the revolving ring 30, a polyurethane rubber is heated to improve mechanical strength so as to enhance abrasion resistance.

Figure 9:
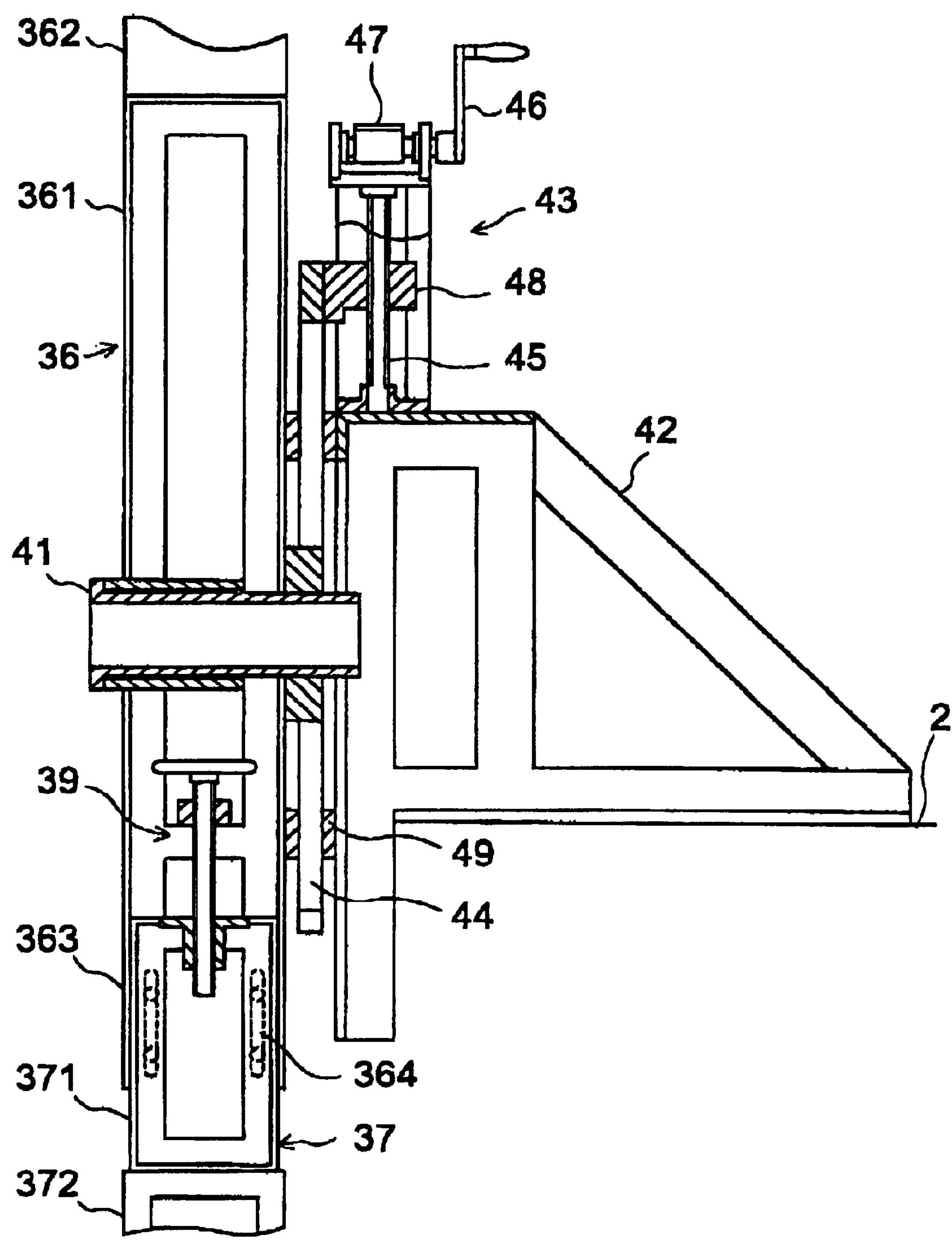
FIG. 9 is a side sectional view of a shifting mechanism of a lower frame and a centering device of an upper frame.

As shown in a side sectional view of FIG. 9, an end of the upper frame 361, which is opposite to the end where the guide frame 362 of the upper frame 36 is attached, has a guide 363 for sliding the support frame 371 of the lower frame 37 and a feed mechanism 39 for shifting the lower frame 37. The feed mechanism 39 may have, for example, a feed screw and a handle. The guide 363 has a long groove 364 for fixing the lower frame 37. The upper end of the lower frame 37, which is fitted into the guide 363 of the upper frame 36, is connected to the feed mechanism 39, and the side surface has a plurality of female screws into which fixing bolts 40 are to be attached.

At a position which becomes a center of rotation of the revolving ring 30, a pipe protection ring 41 is provided. This part of the upper frame 36 provided with the pipe protection ring 41 is, as shown in FIG. 9, fixed to a slider 44 which is shifted in the up-and-down direction by a centering device 43 attached to a frame 42 fixed to the running truck 2.

Figure 10:
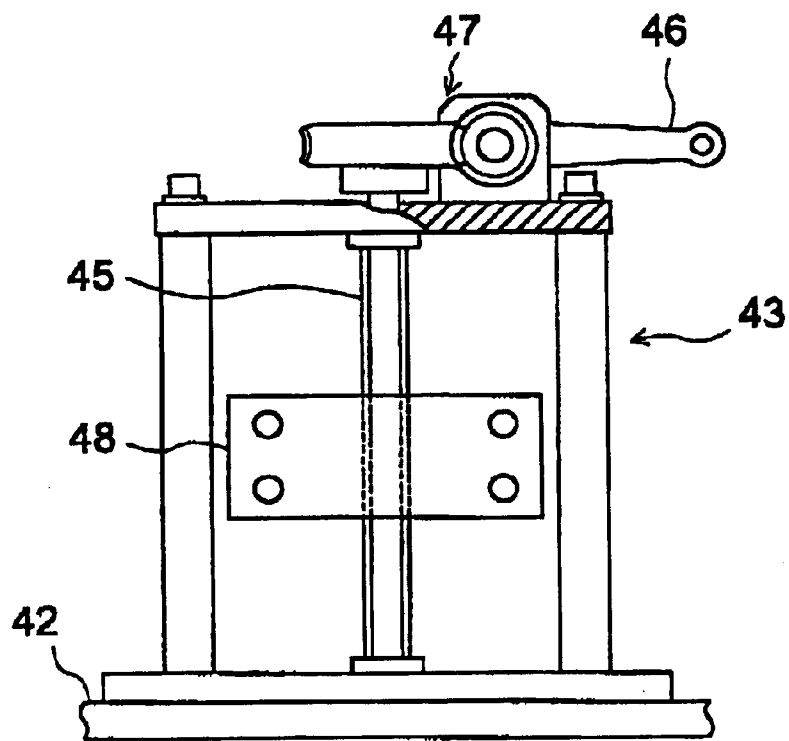
FIG. 10 is a front elevation view of the above-described centering device.

The centering device 43 has, as shown in a front elevation view of FIG. 10, a feed screw 45, a feed handle 46, a gear wheel group 47 for connecting the feed handle 46 and feed screw 45, and an elevating portion 48 which is shifted by a feed screw 45 rotation. The slider 44 is attached to the elevating portion 48 and is shifted, by a shift of the elevating portion 48, in the up-and-down direction along a guide 49 provided on the frame 42.

Figure 7:
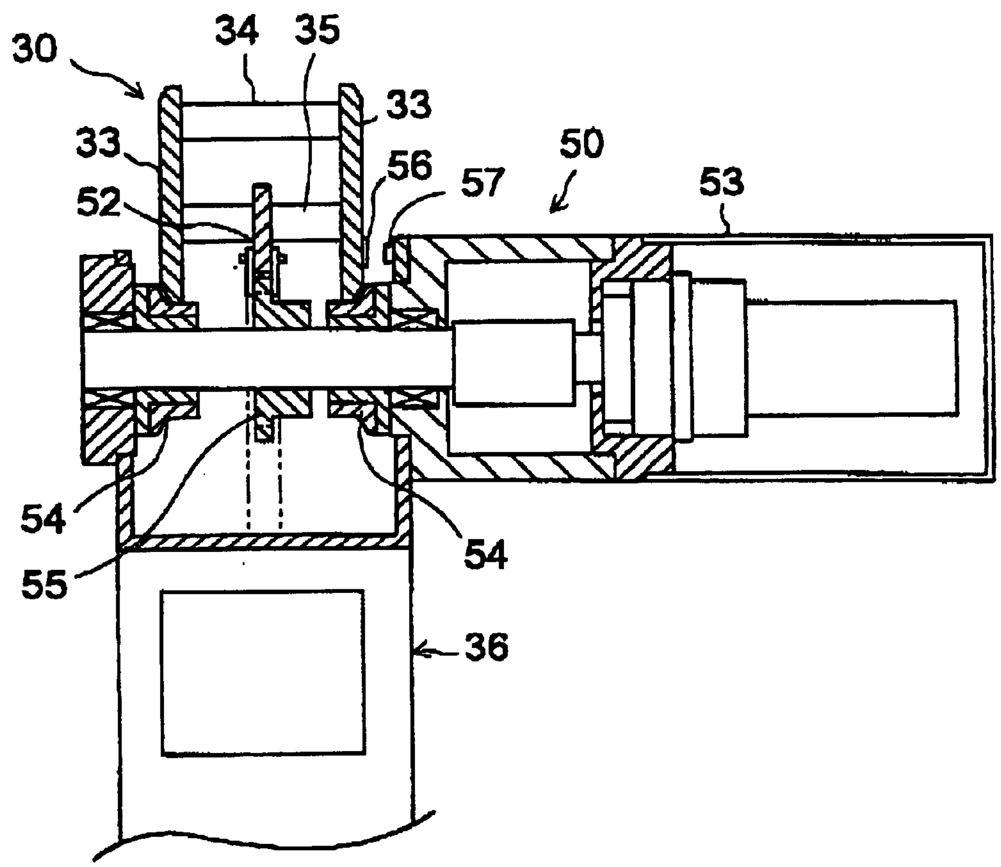
FIG. 7 is a constructional view of a revolving ring drive.
Figure 8:
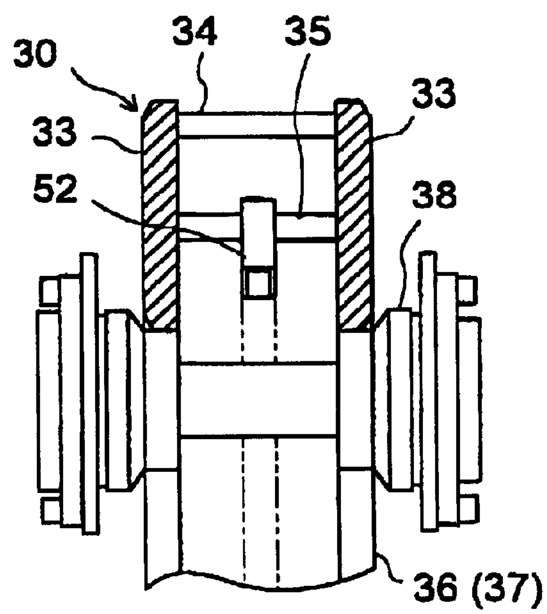
FIG. 8 is a constructional view of a guide roller provided in an upper frame and a lower frame.

The revolving ring drive mechanism 32 has, as shown in FIG. 6, a revolving ring drive 50 attached to the upper portion of the guide frame 362 of the upper frame 36 and brakes 51 attached to the lower portion of the lower frame 372. The revolving ring drive 50 has, as shown in FIG. 7, a drive chain 52 attached in an annular shape to a plurality of connecting shafts 34 and 35 provided inside the revolving ring 3; a ring motor 53; a guide roller 54 attached to a rotation shaft of the ring motor 53 and latched with the inner circumferential surface of the revolving ring 30; a sprocket 55 attached to the rotation shaft of the ring motor 53 and engaged with a drive chain 52 attached to the revolving ring 30; and a revolving origin sensor 57, being attached to the guide frame 362 of the upper frame 36, for detecting a reference 56 attached to the revolving ring 30.

Figure 11:
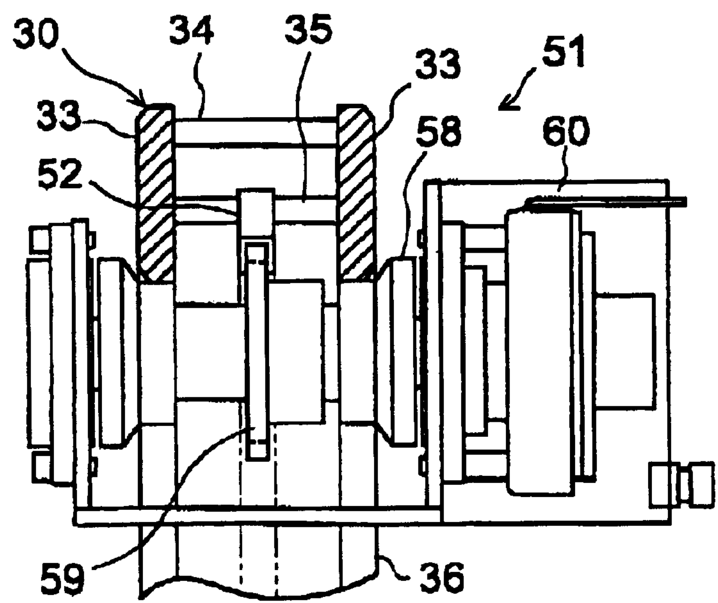
FIG. 11 is a constructional view of a brake.

The brakes 51 have, as shown in a constructional view of FIG. 11, a ring brake 60 connected to a rotation shaft having a guide roller 58 to be latched with the inner circumferential surface of the revolving ring 30 and a brake sprocket 59 to be engaged with the drive chain 52 attached to the revolving ring 30.

The spray gun mechanism 4 has, as shown in FIG. 1, a spray gun 62 attached to the revolving ring 30 via a gun holding portion 61 and to be of a mixing and colliding-type for dosing and mixing two supplied solutions, a gun drive 63 having a spraying solenoid for opening and closing the spray gun 62 nozzle, a heater, etc., a rotary joint 64 provided on the running truck 2, and a rotary joint drive motor 65 connected to the rotary joint 64. A supply hose 66 joined to a rotational-side pipeline of the rotary joint 64 is connected to the gun truck drive 63 through the pipe protection ring 41 of the revolving ring 30, and a supply hose joined to a stationary-side pipeline is connected to a quantitative feeder (unillustrated).

Figure 12:
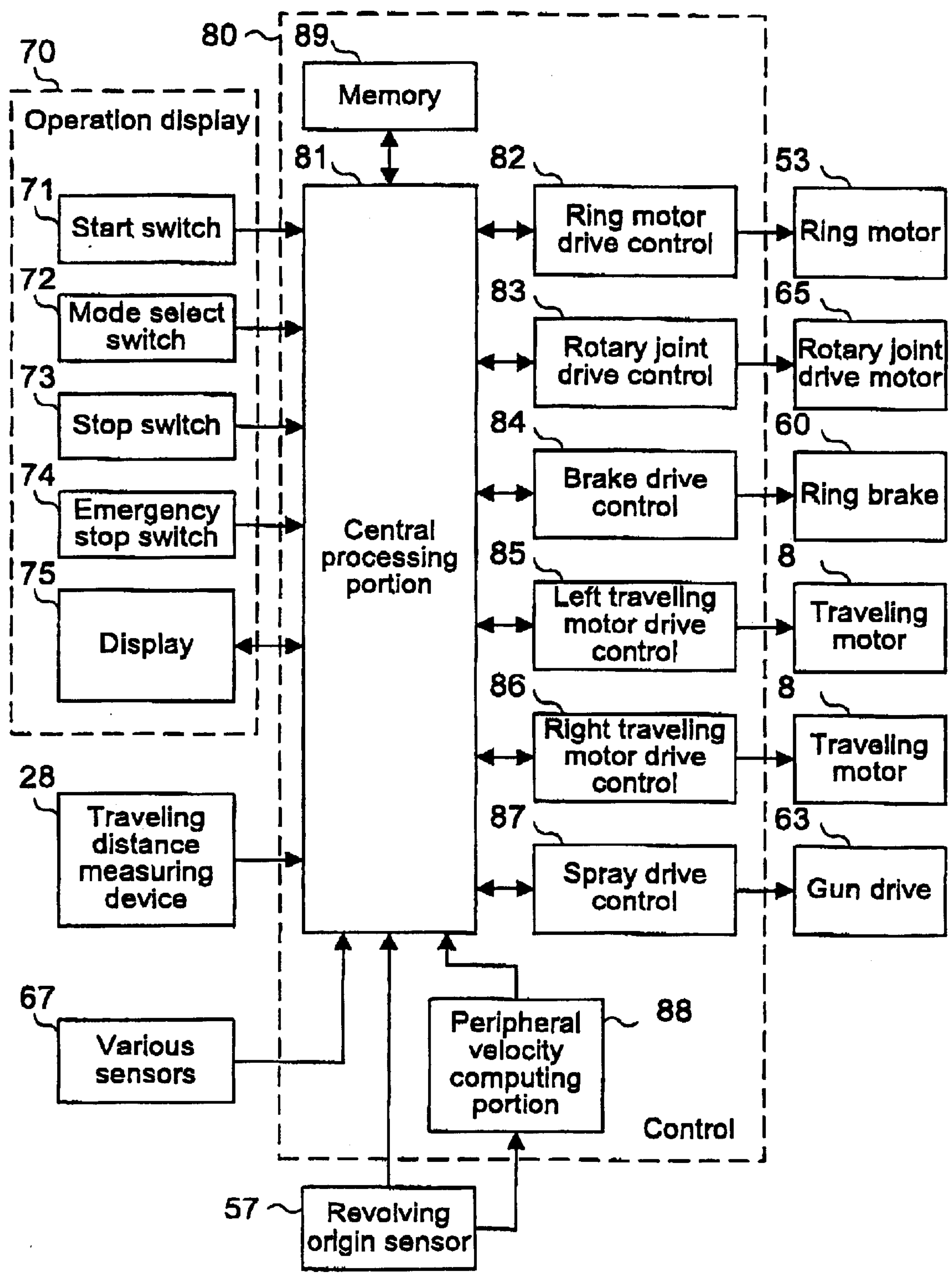
FIG. 12 is a block diagram showing a configuration of a controller.

The controller 5 has, as shown in a block diagram of FIG. 12, an operation display 70 and a control 80. The operation display 70 has various operation switches such as a start switch 71, a mode select switch 72, a stop switch 73, an emergency stop switch 74 and a display 75. The control 80 has a central processing portion 81 which receives signals from various sensors 67 provided on the running truck 2, etc., and the operation display 70, administrates and controls the entire operation of the apparatus for producing a coating layer onto a primary lining 1, a ring motor drive control 82 for controlling drive of the ring motor 53, a rotary joint drive control 83 for controlling drive of the rotary joint drive motor 65, a brake drive control 84 for controlling drive of the ring brake 60, a left running motor drive control 85 and a right running motor drive control 86 for independently controlling drive of the left and right running motors 8, respectively, a spray drive control 87 for controlling the gun truck drive 63, a peripheral velocity computing portion 88 for calculating peripheral velocity of the revolving ring 30 based on a pulse signal outputted from the revolving origin sensor 57.

Since the interior surface of a primary lining such as segments after completing primary lining is covered with a polyurea resin by use of this apparatus for producing a coating layer onto a primary lining 1, for assembly on the site, first, the running truck 2 without the revolving ring 30 attached is carried into a vertical shaft having a pipe, then, the revolving ring 30 is carried into the vertical shaft. When this revolving ring 30 is carried into the vertical shaft, the revolving ring 30 is divided into, for example, four or six parts in advance, and these are assembled after being carried into the vertical shaft, thus the revolving ring 30 having a large diameter of, for example, 3 m can be easily carried into or carried out of the vertical shaft. After assembling the revolving ring 30 in the vertical shaft, the handle of the feed mechanism 39 provided in the upper frame 36 fixed to the running truck 2 is operated to raise the lower frame 37. Then, the revolving ring 30 is latched with the guide rollers 38 provided on both ends of the guide frame 362 of the upper frame 36, the guide rollers 54 provided in the revolving ring drive 50, and the guide rollers 58 provided in the brakes 51, and then the drive chain 52 provided in the inner circumferential portion of the revolving ring 30 is engaged with the sprocket 55 provided on the rotation shaft of the ring motor 53 and the brake sprocket 59 of the brake 51. In this condition, the handle of the feed mechanism 39 is operated to lower the lower frame 37 to be engaged with the guide rollers 38 provided on both ends of the guide frame 372 of the lower frame 37 and the guide rollers 58 provided in the brakes 51, and the drive chain 52 provided in the inner circumferential portion of the revolving ring 30 is engaged with the brake sprocket 59 of the brake 51, the lower frame 37 is fixed to the upper frame 36 by the fixing bolts 40. While the upper frame 36 and lower frame 37 are strained, the revolving ring 30 is rotatably held. Next, the spray gun 62 is attached to a position predetermined depending on the position of the reference 56 of the revolving ring 30. The supply hose 66, etc., are joined to assemble the apparatus for producing a coating layer onto a primary lining 1 in the vertical shaft, and are joined to quantitative feeders, which supply, for example, isocyanate and amine, respectively. When the spray gun 62 is attached to this revolving ring 30, the distance from the spray gun 62 to the interior surface of the primary lining to be coated is made uniform by use of a regulating tool. After assembling the apparatus for producing a coating layer onto a primary lining 1 as such, the revolving ring support frame 31 is shifted in the up-and-down direction by the centering device 43 provided on the running truck 2 to make the center of rotation of the revolving ring 30 aligned with the center axis of the interior surface of the primary lining.

A polyurea resin formed by this apparatus for producing a coating layer onto a primary lining 1 is formed by a chemical reaction between isocyanate (—NCO) and an amino group (—$NH_2$), its finger-touch hardening time is extremely quick, namely, 5–10 seconds, and no solvent is used. Therefore, the polyurea resin receives no influence from an external environment including temperature and humidity, the polyurea resin is excellent in chemical resistance including acid resistance and alkali resistance, and the polyurea resin has flexibility.

Operations when the interior surface of a primary lining such as segments after completing primary lining is covered with a polyurea resin by use of this apparatus for producing a coating layer onto a primary lining 1 will be described with reference to a flowchart of FIG. 13.

Figure 14:
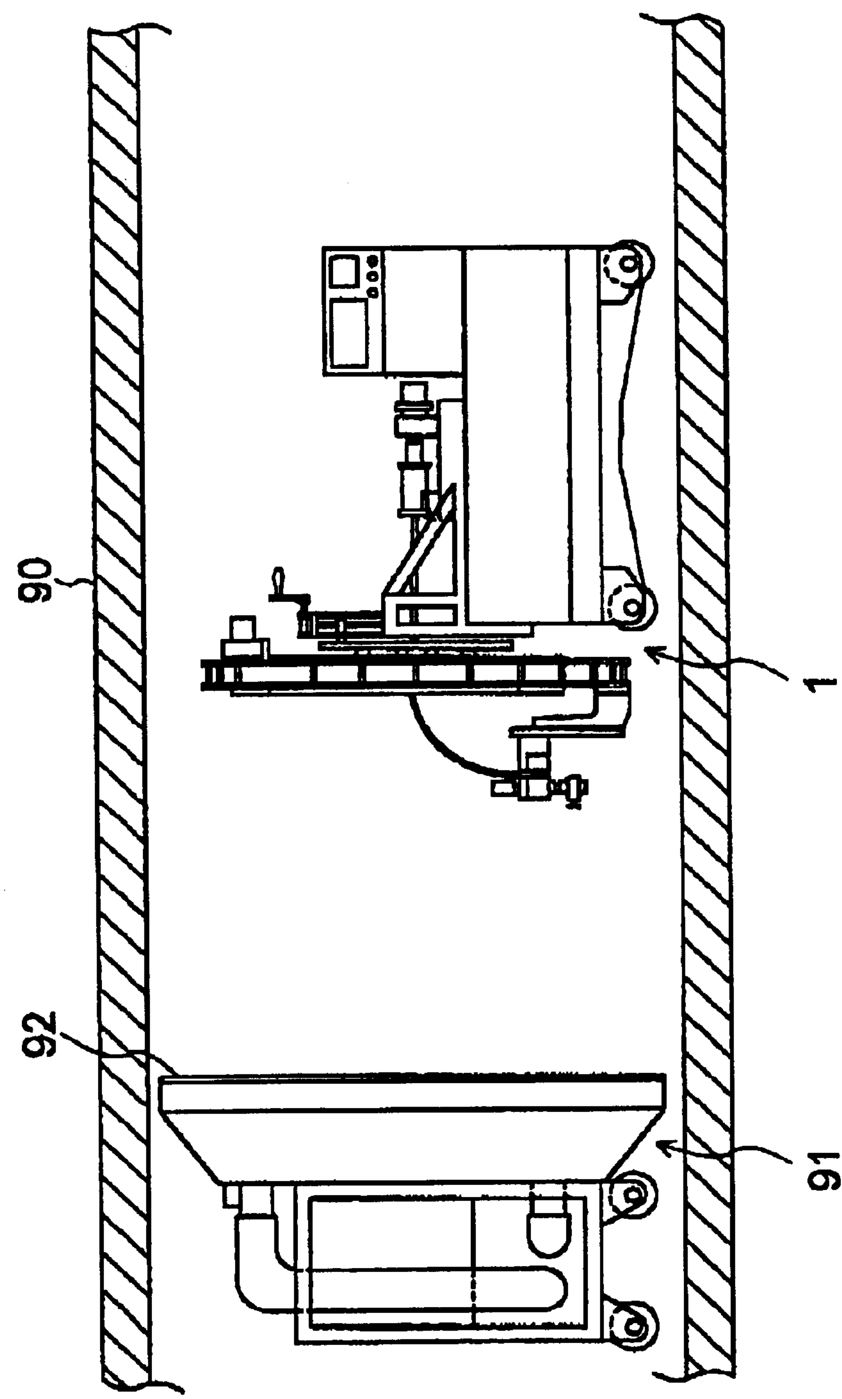
FIG. 14 is a sectional view showing a condition where the interior surface of a primary lining is being coated.
Figure 15:
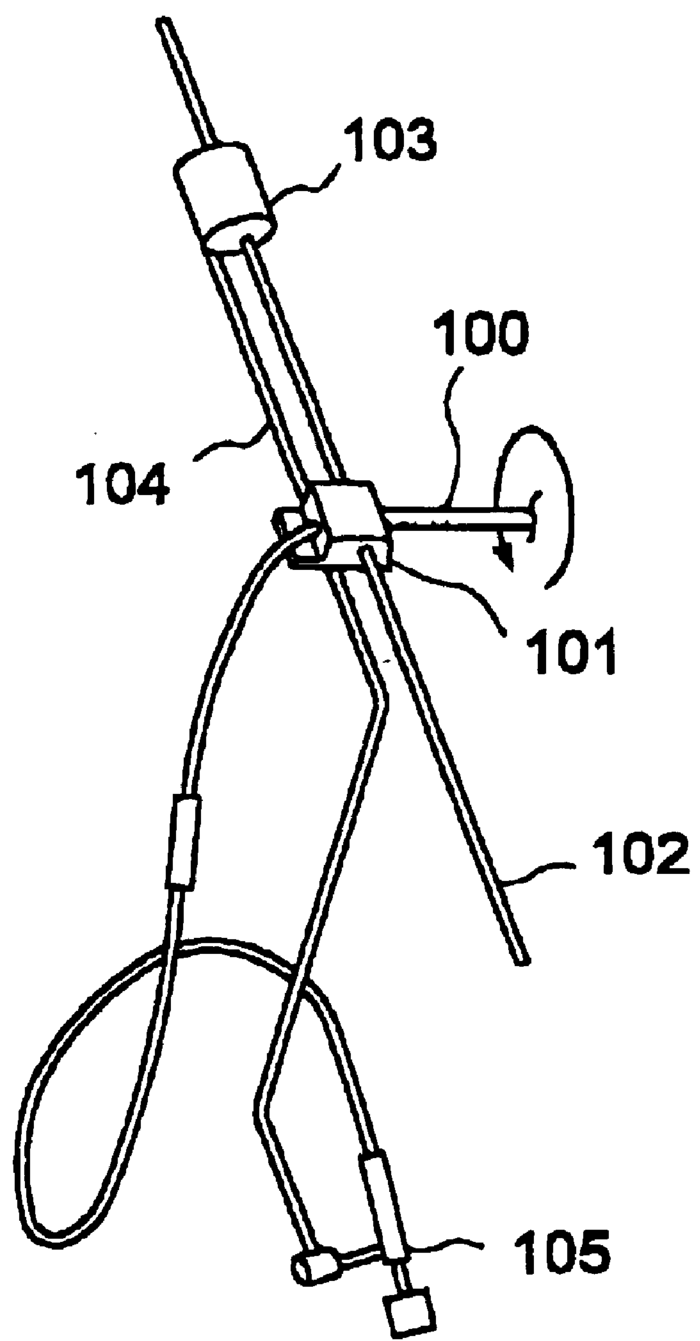
FIG. 15 is a constructional view of related art.

After the apparatus for producing a coating layer onto a primary lining 1 is assembled in the vertical shaft, as shown in FIG. 14, the apparatus for producing a coating layer onto a primary lining 1 is advanced to a predetermined coating position of a primary lining 90. At this time, a dust collector 91 using fluorine fibers and glass fibers, etc., for its filter 92 is arranged at a position ahead of the spray gun 62 of the apparatus for producing a coating layer onto a primary lining 1 by a fixed distance.

Then, an automatic or manual operation mode is set by the mode selection switch 72, and when the start switch 71 of the operation display 70 is turned on (step S1), the central processing portion 81 confirms the condition of various safety devices and judges as to whether it is a condition where operation is possible (step S2). As a result of this judgment, if operation is impossible, an error display is indicated on the display 75 (step S3). When an operator who confirmed this error display eliminates causes of the error, then turns on the start switch 71 (steps S4 and S1), the central processing portion 81 again confirms condition of the various safety devices and judges as to whether it is a condition where operation is possible (step S2). As a result of this judgment, if it is a condition where operation is possible, the central processing portion sends a drive signal to the ring motor drive control 82 and simultaneously sends a drive signal to the rotary joint drive control 83, as well. Upon receiving the drive signal, the ring motor drive control 82 drives the ring motor 53 at a predetermined number of revolutions to rotate the revolving ring 30. At this time, the ring motor drive control 82 controls the ring motor 53 by feedback control of a peripheral velocity calculated by the peripheral velocity computing portion 88. Upon receiving the drive signal, the rotary joint drive control 83 also drives the rotary joint drive motor 65 to rotate the rotary joint 64 at a number of revolutions identical to the number of revolutions of the revolving ring 30 (step S5).

When this revolving ring 30 rotates, since the revolving ring 30 is rotated by being guided by the guide rollers 38 provided on the upper frame 36 and lower frame 37 of the revolving ring support frame 31, the guide rollers 58 of the brakes 51, and the guide rollers 54 provided on the rotation shaft of the ring motor 53, a stable rotation is realized while lateral runout is prevented. In addition, since the revolving ring 30 is rotated by rotating, by the ring motor 53, the sprocket 55 engaged with the drive chain 52 provided in the inner circumferential portion of the revolving ring 30, the revolving ring 30 can be rotated by a small rotational torque, therefore, the ring motor 53 can be reduced in size. In addition, although the spray gun 62 is rotated as a result of a rotation of the revolving ring 30, since the supply hose 66 connected to the spray gun 62 is joined to a movable-side pipe of the rotary joint 64 and the rotary joint 64 is rotated in synchronization with a rotation of the revolving ring 30, twisting the supply hose 66 can be prevented.

When the revolving ring 30 is started to rotate, the peripheral velocity computing portion 88 computes, by the revolving origin sensor 57, a peripheral velocity of the revolving ring 30 based on a pulse signal inputted at each time of detection of the reference 56 provided on the revolving ring 30 and sends the peripheral velocity to the central processing portion 81. When the received peripheral velocity of the revolving ring 30 reaches a predetermined steady velocity (step S6), the central processing portion 81 judges the operation mode (step S7), and the operator operates, if in manual mode, the operation display 70 to travel the running truck 2 so as to start coating (step S17). If an automatic mode has been set, when the reference 56 provided on the revolving ring 30 is detected by the revolving origin sensor 57, it is judged that the spray gun 62 has arrived at a predetermined position (step S8). A drive signal is sent to the left running motor drive control 85 and a right running motor drive control 86 to rotate the left and right running motors 8 provided on the running truck 2 by the left running motor drive control 85 and right running motor drive control 86 so as to start moving the running truck 2. Simultaneously, a drive signal is sent to the spray drive control 87 to drive the solenoid of the gun truck drive 63. And then isocyanate and amine, which are heated and pressurized by a quantitative feeder each sent by a fixed amount from the supply hose having a heater and kept warm with a fixed temperature, through the rotary joint 64, to the supply hose 66, are mixed by the spray gun 62 and sprayed on the interior surface of the primary lining 90 (step S9). When this coating starts, the operator starts measurement of a running distance by the running-distance-measuring device 28. This running distance being measured is sent to the central processing portion 81 and is stored in the memory portion 89 together with various parameters.

When a polyurea resin coating is being applied by this spray gun 62, since the spray gun 62 is rotated by the revolving ring 30 at a steady peripheral velocity, a homogenous coating layer can be formed with a fixed thickness on the interior surface of the primary lining 90. In addition, mist, etc., which occurs when the polyurea resin coating material is applied by the spray gun 62, is collected by the dust collector 91, and deterioration in the working environment can be prevented.

When the polyurea resin coating material is being applied by the spray gun 62 by rotating the revolving ring 30 while this running truck 2 is being moved at a steady speed, the central processing portion 81 monitors whether or not an abnormality has occurred based on signals inputted from various sensors 67 (step S10) provided in the running truck 2, etc. If, for example, an operator is caught by the revolving ring 30 and the rotational torque of the ring motor 53 exceeds a prescribed value, the central processing portion 81 outputs an emergency stop signal to stop drive of the ring motor 53 and drives the ring brake 60 by the brake drive control 84, whereby rotation of the brake sprocket 59 is forcibly stopped, rotation of the drive chain 52 engaged with the brake sprocket 59 is locked to stop the revolving ring 30 for an emergency stop of the running truck 2 (step S18).

If no abnormality occurs when the polyurea resin coating material is being applied by the spray gun 62 by rotating the revolving ring 30, moving of the running truck 2 and spraying by the spray gun 62 are continued (step S11). During moving of this running truck 2, if the running truck 2 travels in a biased manner, the drive wheels 16 of the running truck 2 can be driven left to right independently, therefore, if the operator transmits a drive force only to the biased moving-side drive wheel 16 by releasing a connection of the clutch switching portion 23 by an operation of the handle 22 of the clutch mechanism portion 12 on the side opposite to the biased moving side of the running truck 12, the biased moving can be eliminated by a difference in speed between the right and left drive wheels 16.

After this coating is continued and a predetermined region of the primary lining 90 is coated, when completing coating, the operator turns on the stop switch 73 of the operation display 70 to send a stop signal to the central processing portion 81 (steps S12 and S13). The central processing portion 81 stops, upon receiving the stop signal, moving of the running truck 2 and spraying of the polyurea resin coating material from the spray gun 62 (step S14). Thereafter, upon detecting that the spray gun 62 has reached a predetermined position based on a detection signal of the reference 56 provided on the revolving ring 30 inputted from the revolving origin sensor 57 (step S15), the central processing portion 81 stops drive of the ring motor 53 by driving the ring brake 60 (step S16).

While moving the running truck 2 as such, by applying the polyurea resin coating by rotating the spray gun 62 at a steady peripheral velocity by use of the revolving ring 30, a coating layer having a uniform thickness can be quickly formed on the interior surface of the primary lining 90.

In addition, when coating is completed, since the distance for which the running truck 2 moved while carrying out coating has been stored, the coated region can be accurately confirmed, therefore, a coating starting position for subsequent coating can be accurately confirmed.

In the above, a description has been given in a case where a polyurea resin coating layer is formed on the interior surface of the primary lining 90 by applying a polyurea resin coating material from the spray gun 62. However, a covering of another two solution-mixture type coating can also be formed in a similar manner.

In addition, in the above, a description has been given in a case where the spray gun 62 is fixed to the revolving ring 30 according to the diameter of the primary lining 90. However, by providing a cylinder or a screw feeding mechanism, attaching the spray gun 62 to the revolving ring 30 via a feed mechanism shiftable in the radial direction of the revolving ring 30, and making the spray gun 62 position variable according to the distance from the coating surface, the interior surface of a pipe with an invert and the interior surface of a pipe formed with a square sectional surface can also be coated in a similar manner.

The spray gun may have a chamber having a first inlet for introducing a first raw material, a second inlet for introducing a second raw material. The first raw material reacts with the second raw material in the chamber to give a coating material such as a thermosetting resin coating material. The chamber has an outlet for ejecting a coating material.

A spindle may be inserted to the chamber to plug the first inlet, the second inlet and the outlet so that the chemical reaction is prevented. The spindle may be removed from the chamber so that the first raw material mixes with the second raw material in the chamber to eject the coating material.

Preferably, the first inlet and the second inlet are disposed such that both inlets are opposite to each other. In this configuration, the first raw material ejected from the first inlet collides the second raw material ejected from the second inlet, thereby instantly mixing the first raw material with the second raw material to give a coating material, which is ejected from the chamber.

As has been described in the above, according to the present invention, the spray gun is attached to the revolving ring attached to the running truck, the revolving ring is rotated at a steady peripheral velocity while a coating material is applied by the spray gun. Therefore, a homogeneous coating layer can be formed with a uniform thickness on the interior surface of a primary lining.

In addition, by respectively independently driving and controlling the right and left drive wheels in the forward direction of the running truck, when meandering occurs while the running truck is moving and at curved portions of a primary lining, a difference in rotating speed can be provided between the right and left drive wheels, whereby, the meandering can be corrected and smooth moving is realized even at the curved portions of the primary lining.

Furthermore, by forming the revolving ring by connecting two frames formed in an annular shape in parallel by a plurality of connecting shafts, a reduction in weight of the revolving ring can be realized.

In addition, by holding the inner circumferential surface of the revolving ring by the guide rollers provided on the guide frames of the upper frame and lower frame, the revolving ring can be stably rotated without runout.

By rotating this revolving ring by the revolving ring drive motor for rotating the drive transmission mechanism engaged with the drive chain or rack provided in an annular shape in the inner circumferential portion of the revolving ring, the lightweight revolving ring can be rotated by a small rotational torque, therefore, the revolving ring drive motor can be reduced in size.

In addition, by providing one or a plurality of brakes on the respective guide frames of the upper frame and lower frame, the revolving ring in rotation can be stably stopped, therefore, work safety can be realized.

In addition, by joining the supply hose, which is joined to the spray gun attached to the revolving ring to be rotated, to a rotational-side pipe of a rotary joint attached to the running truck, twisting of the supply hose can be prevented when the revolving ring is rotated, therefore, a coating material can be stably supplied to the spray gun.

In addition, by rotating the revolving ring at a steady peripheral velocity while applying a coating material from the spray gun, a homogeneous coating layer without a coating unevenness can be stably formed.

Furthermore, by forming the revolving ring in four parts or six parts, the revolving ring can be easily carried into and carried out of a narrow vertical shaft, etc.

In addition, by rotating the rotary joint in synchronization with a rotation of the revolving ring, twisting of the supply hose joined to the spray gun can be reliably prevented, a coating material can be stably supplied to the spray gun.

In addition, by detecting the reference provided on the revolving ring by the position detecting sensor, calculating a peripheral velocity of the revolving ring based on an output signal from the position detecting sensor, and controlling a rotation of the revolving ring drive motor by feedback control of the calculated peripheral velocity, the revolving ring can be stably rotated at a steady speed.

Furthermore, by moving the running truck and applying a coating material from the spray gun after peripheral velocity of the revolving ring becomes steady, a coating layer with a uniform thickness can be reliably formed.

In addition, by using a mixing and colliding-type spray gun, a two-solution mixture-type coating material can be stably mixed and applied.

Furthermore, by applying a polyurea resin coating material from the spray gun, a coating layer whose finger-touch hardening time is extremely quick, namely, 5 to 10 seconds, which receives no influence from an external environment including temperature and humidity, which is excellent in endurance and chemical resistance including acid resistance and alkali resistance, and which has flexibility can be stably formed.

What is claimed is:

1. An apparatus for producing a coating layer onto a primary lining comprising:

a running truck having:
- a first drive wheel,
- a second drive wheel, and
- a drive for independent driving control of said first drive wheel and said second drive wheel, respectively;

a revolving ring mechanism having:
- a revolving ring wherein said revolving ring has two frames formed in an annular shape and a plurality of connecting shafts connecting said frames in parallel,
- a revolving ring support frame wherein said revolving ring support frame has an upper frame and a lower frame, the upper frame has a first support frame and a first guide frame provided orthogonally to the end of the first support frame, the lower frame has a second support frame and a second guide frame provided orthogonally to the end of the second support frame, said first support frame of said upper frame is attached to a front surface in a forward direction of the running truck via a centering mechanism, said second support frame of said lower frame is attached to said first support frame of said upper frame so as to be shiftable, and on both ends of the first guide frame and the second guide frame are provided a first guide roller and a second guide roller to be latched with the inner circumferential surface of said revolving ring, respectively, and
- a revolving ring drive mechanism wherein said revolving ring drive mechanism has a revolving ring drive motor for rotating a drive transmission mechanism to be engaged with a drive chain or rack provided in an annular shape in the inner circumferential portion of said revolving ring and one or more brakes attached to the first guide frame or the second guide frame;

a spray gun mechanism having:
- a spray gun attached to said revolving ring,
- a rotary joint attached to said running truck, and
- a supply hose for feeding a coating material, the supply hose being connected to the rotary joint; and a controller wherein said controller rotates the revolving ring at a steady peripheral velocity while said spray gun applies a coating material.

2. The apparatus for producing a coating layer onto a primary lining as set forth in claim 1, wherein said revolving ring are separable into a plurality of identical parts.

3. The apparatus for producing a coating layer onto a primary lining as set forth in claim 2, wherein said revolving ring has four identical parts.

4. The apparatus for producing a coating layer onto a primary lining as set forth in claim 2, wherein said revolving ring has six identical parts.

5. The apparatus for producing a coating layer onto a primary lining as set forth in claim 1, wherein said controller rotates the rotary joint in synchronization with a rotation of the revolving ring.

6. The apparatus for producing a coating layer onto a primary lining as set forth in claim 1, wherein said revolving ring has a position detecting sensor for detecting a reference.

7. The apparatus for producing a coating layer onto a primary lining as set forth in claim 6 wherein said controller has a peripheral velocity operating means for calculating a peripheral velocity of the revolving ring based on an output signal from the position detecting sensor.

8. The apparatus for producing a coating layer onto a primary lining as set forth in claim 4, wherein said controller makes, after the peripheral velocity of the revolving ring becomes steady, the running truck move and the spray gun apply a coating material.

9. The apparatus for producing a coating layer onto a primary lining as set forth in claim 1, wherein said spray gun has a chamber having a first inlet for introducing a first raw material, a second inlet for introducing a second raw material, and an outlet for ejecting a coating material wherein the first raw material reacts with the second raw material to give the coating material.

10. The apparatus for producing a coating layer onto a primary lining as set forth in claim 9, wherein the coating material contains a thermosetting resin.

11. The apparatus for producing a coating layer onto a primary lining as set forth in claim 9 wherein the coating material contains one species selected from the group consisting of a polyurea resin and a polyurethane resin.

12. The apparatus for producing a coating layer onto a primary lining as set forth in claim 1, wherein the first support frame and the first guide frame are formed in a T-shape, and the second support frame and the second guide frame are formed in a T-shape.

* * * * *

UNITED STATES PATENT AND TRADEMARK OFFICE

CERTIFICATE OF CORRECTION

PATENT NO. : 6,752,873 B2
DATED : June 22, 2004
INVENTOR(S) : Shuzo Kato et al.

It is certified that error appears in the above-identified patent and that said Letters Patent is hereby corrected as shown below:

Title page,
Insert Item -- [73] Assignee: Nippon Kokan Koji Corporation
Yokohama-shi, Kanagawa Japan

Nippon Paint Co., Ltd.
Osaka-shi, Osaka, Japan --

Signed and Sealed this

Fourth Day of January, 2005

JON W. DUDAS
*Director of the United States Patent and Trademark Office*